(12) United States Patent
Li et al.

(10) Patent No.: US 12,111,437 B1
(45) Date of Patent: Oct. 8, 2024

(54) METHOD FOR DETECTING STRUCTURAL ABNORMAL AREA OF COAL AND ROCK MASS

(71) Applicant: CCTEG CHINESE INSTITUTE OF COAL SCIENCE, Beijing (CN)

(72) Inventors: Xiangshang Li, Beijing (CN); Chunyang Cui, Beijing (CN); Weiyu Zheng, Beijing (CN); Haitao Li, Beijing (CN); Qingxin Qi, Beijing (CN); Jiamin Wang, Beijing (CN); Meimei Wang, Beijing (CN); Chi Liu, Beijing (CN); Weisheng Du, Beijing (CN)

(73) Assignee: CCTEG CHINESE INSTITUTE OF COAL SCIENCE, Beijing (CN)

( * ) Notice: Subject to any disclaimer, the term of this patent is extended or adjusted under 35 U.S.C. 154(b) by 0 days.

(21) Appl. No.: 18/674,783

(22) Filed: May 24, 2024

(30) Foreign Application Priority Data

Oct. 11, 2023 (CN) .......................... 202311311805.3

(51) Int. Cl.
*G01V 1/30* (2006.01)
*G01V 1/147* (2006.01)
*G01V 1/28* (2006.01)

(52) U.S. Cl.
CPC .............. *G01V 1/303* (2013.01); *G01V 1/147* (2013.01); *G01V 1/282* (2013.01); *G01V 1/306* (2013.01); *G01V 2210/6222* (2013.01)

(58) Field of Classification Search
CPC ........ G01V 1/303; G01V 1/147; G01V 1/282; G01V 1/306; G01V 2210/6222
See application file for complete search history.

(56) References Cited

U.S. PATENT DOCUMENTS

2016/0131781 A1 5/2016 Sun et al.
2023/0168406 A1 6/2023 Cao et al.

FOREIGN PATENT DOCUMENTS

CN 102116871 7/2011
CN 105719433 6/2016
(Continued)

OTHER PUBLICATIONS

CNIPA, First Office Action for CN Application No. 202311311805.3, Nov. 21, 2023.
(Continued)

*Primary Examiner* — Yuqing Xiao
*Assistant Examiner* — Christopher Richard Walker
(74) *Attorney, Agent, or Firm* — Hodgson Russ LLP (57) ABSTRACT

A method for detecting a structural abnormal area of a coal and rock mass is provided. The method includes acquiring a target velocity inversion map of the coal and rock mass in a target detection cycle, in which the target velocity inversion map is configured to indicate a target velocity of seismic wave propagation in each of grid cells in a target detection area, acquiring a first velocity of seismic wave propagation in any one of the grid cells in at least one detection cycle preceding the target detection cycle, determining, according to each of the first velocities and the target velocities, structural abnormal cells from each of the grid cells, and determining, according to the structural abnormal cells, a range of the structural abnormal area of the coal and rock mass in the target detection cycle in the target velocity inversion map.

12 Claims, 3 Drawing Sheets

(56) References Cited

FOREIGN PATENT DOCUMENTS

| | | |
|---|---|---|
| CN | 107561584 | 1/2018 |
| CN | 109239777 | 1/2019 |
| CN | 109521467 | 3/2019 |
| CN | 112363210 | 2/2021 |
| CN | 114966855 | 8/2022 |
| CN | 115144892 | 10/2022 |

OTHER PUBLICATIONS

CNIPA, Notification to Grant Patent Right for Invention for CN Application No. 202311311805.3, Nov. 30, 2023.
Han et al., "Rock-burst Danger Prediction of Mining Face Based on Seismic CT Transmission Technology," Coal Mining Technology, Jun. 2013, vol. 18, No. 3.

METHOD FOR DETECTING STRUCTURAL ABNORMAL AREA OF COAL AND ROCK MASS

CROSS-REFERENCE TO RELATED APPLICATION

This application claims priority to Chinese Patent Application No. 202311311805.3, filed Oct. 11, 2023, the entire disclosure of which is incorporated herein by reference.

FIELD

The present disclosure relates to the field of data processing technology, and more particularly to a method for detecting a structural abnormal area of a coal and rock mass, a device for detecting a structural abnormal area of a coal and rock mass, a device and a medium.

BACKGROUND

Geological exploration runs through an entire life cycle of safe production of coal mines and is a necessary condition for safe production of coal mines. In order to ensure safe production of coal mines, it is necessary to conduct a comprehensive survey of a geological structure before production to identify folds, faults, magmatic rock intrusions, etc., and analyze influencing factors of safe production combined with the structure, so as to make effective avoidance schemes. However, in a process of coal mining, an original stress state of overlying rock is destroyed. A stress IS redistributed, and enters a new relatively stable state under the interference of external force or its own organization. The overlying rock is disturbed by mining, and an overlying rock layer moves and deforms, resulting in continuous and discontinuous damage, which affects the stability of goaf and even causes surface subsidence. This process is not accomplished overnight, but is constantly developing dynamically.

How to accurately monitor a coal and rock mass structure in an entire life cycle of a mine is of great significance to guide and solve issues related to rock stratum control in mining engineering.

SUMMARY

In a first aspect, embodiments of the present disclosure provide a method for detecting a structural abnormal area of a coal and rock mass. The method includes acquiring a target velocity inversion map of the coal and rock mass in a target detection cycle, in which the target velocity inversion map is configured to indicate a target velocity of seismic wave propagation in each of grid cells in a target detection area, acquiring a first velocity of seismic wave propagation in any one of the grid cells in at least one detection cycle preceding the target detection cycle, determining, according to each of the first velocities and the target velocities, structural abnormal cells from each of the grid cells, and determining, according to the structural abnormal cells, a range of the structural abnormal area of the coal and rock mass in the target detection cycle in the target velocity inversion map. Determining, according to each of the first velocities and the target velocities, the structural abnormal cells from each of the grid cells includes for any one of the grid cells, determining, according to each of the first velocities and the target velocities of the grid cells, a wave velocity variation trend of the grid cell, and determining that the grid cell is the structural abnormal cell, in response to the wave velocity variation trend of the grid cell being an upward trend and the target velocity being greater than a first set threshold. Acquiring the target velocity inversion map of the coal and rock mass in the target detection cycle includes determining the target detection area of the coal and rock mass and a target seismic source energy corresponding to at least one drop hammer impact seismic source, for the target detection cycle, in which the target detection area is provided with a plurality of geophones at a first side thereof, and is provided with excitation points corresponding to each of the drop hammer impact seismic sources at a second side thereof, controlling each of the drop hammer impact seismic sources to excite seismic waves via corresponding excitation points under a corresponding target seismic source energy, so that any one of the geophones receives seismic waves excited from each of the excitation points, acquiring a first arrival time of the seismic waves excited at each of the excitation points from any one of the geophones, and determining, according to the first arrival time of the seismic waves excited at each of the excitation points, the target velocity inversion map of the coal and rock mass in the target detection cycle by a seismic wave tomography. Determining, according to the first arrival time of the seismic waves excited at each of the excitation points, the target velocity inversion map of the coal and rock mass in the target detection cycle by the seismic wave tomography includes establishing an initial velocity model, in which each of the grid cells in the target detection area has a corresponding initial velocity, performing, according to the initial velocity and the first arrival time, multiple rounds of iterative inversion calculations on the initial velocity model to update the initial velocity in the initial velocity model to the target velocity, and acquiring, according to the target velocity, the target velocity inversion map of the target detection area in the target detection cycle.

In a second aspect, embodiments of the present disclosure provide an electronic device. The electronic device includes a memory, a processor, and a computer program stored in the memory and executable on the processor. The processor is configured to implement the method for detecting the structural abnormal area of the coal and rock mass provided in the embodiments of the first aspect of the present disclosure when running the computer program In a third aspect, embodiments of the present disclosure provide a non-transitory computer-readable storage medium. The non-transitory computer-readable storage medium has stored therein computer programs that, when executed by a processor, cause the method for detecting the structural abnormal area of the coal and rock mass provided in the embodiments of the first aspect of the present disclosure to be implemented.

In a fourth aspect, embodiments of the present disclosure provide a computer program product. The computer program product includes instructions that, when executed by a processor, causes the processor to implement the method for detecting the structural abnormal area of the coal and rock mass provided in the embodiments of the first aspect of the present disclosure.

Additional aspects and advantages of the present disclosure will be set forth, in part, in the following description, and in part will be apparent from the following description, or learned by practice of the present disclosure.

BRIEF DESCRIPTION OF THE DRAWINGS

The above-mentioned and/or additional aspects and advantages of the present disclosure will be apparent and readily understood from the following description of embodiments taken in conjunction with the accompanying drawings.

DETAILED DESCRIPTION

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are intended to explain the present disclosure and cannot be construed as limiting the present disclosure.

The present disclosure aims to solve at least one of the technical problems in the related art to some extent.

The present disclosure provides a method for detecting a structural abnormal area of a coal and rock mass, a device for detecting a structural abnormal area of a coal and rock mass, a device and a medium, so that a range of the structural abnormal area of the coal and rock mass may be effectively and accurately determined based on a velocity distribution of seismic waves in the coal and rock mass.

The method for detecting the structural abnormal area of the coal and rock mass, the device for detecting the structural abnormal area of the coal and rock mass, the device and the medium according to embodiments of the present disclosure will be described below with reference to the accompanying drawings.

Figure 1:
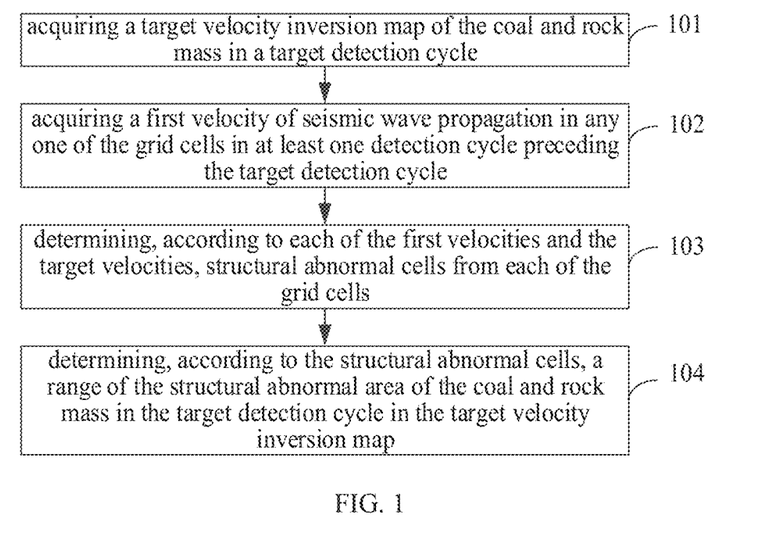
FIG. 1 is a flow chart of a method for detecting a structural abnormal area of a coal and rock mass provided in one embodiment of the present disclosure.

FIG. 1 is a flow chart of a method for detecting a structural abnormal area of a coal and rock mass provided in an embodiment of the present disclosure.

Embodiments of the present disclosure take as an example that a method for detecting a structural abnormal area of a coal and rock mass is configured in a device for detecting a structural abnormal area of a coal and rock mass. The device for detecting the structural abnormal area of the coal and rock mass may be applied to any electronic device, so that the electronic device may perform a function of detecting a structural abnormal area of a coal and rock mass.

The electronic device may be any device with computing capabilities, such as a personal computer (PC), a mobile terminal, a server, etc. The mobile terminal may be, for example, hardware devices with various operating systems, touch screens and/or displays, such as a mobile phone, a tablet computer, a personal digital assistant, and a wearable device.

As shown in FIG. 1, the method for detecting the structural abnormal area of the coal and rock mass may include steps as follows.

In step 101, a target velocity inversion map of the coal and rock mass in a target detection cycle is acquired.

The target velocity inversion map may be configured to indicate a target velocity of seismic wave propagation in each of grid cells in a target detection area.

The target detection area may be an area where a coal and rock mass structure is to be detected.

It is to be noted that the target detection area may be divided into multiple grid cells by using a regular grid. The regular grid may be a square, a rectangle, a triangle, etc., which is not limited in the present disclosure.

It may be understood that in a process of coal mining, a structure of the coal and rock mass may be periodically detected as a progress of coal mining.

Therefore, in the present disclosure, the target velocity inversion map of the coal and rock mass in the target detection cycle may be acquired.

In step 102, a first velocity of seismic wave propagation in any one of the grid cells in at least one detection cycle preceding the target detection cycle is acquired.

In embodiments of the present disclosure, there may be one detection cycle or multiple detection cycles preceding the target detection cycle, which is not limited in the present disclosure.

It is to be noted that a cycle duration of the target detection cycle may be the same as a cycle duration of the detection cycle preceding the target detection cycle, or may be different from a cycle duration of the detection cycle preceding the target detection cycle, which is not limited in the present disclosure.

In the embodiments of the present disclosure, the first velocity of the seismic wave propagation in any one of the grid cells in each of the detection cycles preceding the target detection cycle may be acquired.

In step 103, according to each of the first velocities and the target velocities, structural abnormal cells are determined from each of the grid cells.

In embodiments of the present disclosure, according to each of the first velocities and the target velocities, the structural abnormal cells may be determined from each of the grid cells.

In a possible implementation, for any one of the grid cells, according to each of the first velocities and the target velocities of the grid cells, a wave velocity variation trend of the grid cell may be determined. It is determined that the grid cell is the structural abnormal cell, in response to the wave velocity variation trend of the grid cell being an upward trend and the target velocity being greater than a first set threshold. It is determined that the grid cell is the structural abnormal cell, in response to the wave velocity variation trend of the grid cell being an upward trend first and then a downward trend and the target velocity being greater than a second set threshold. The second set threshold is less than the first set threshold.

In the embodiments of the present disclosure, the first set threshold may be preset. For example, the first set threshold may be 2,000 km/s, 2,100 km/s, etc., which is not limited in the present disclosure.

In the embodiments of the present disclosure, the second set threshold may be preset. For example, the second set threshold may be 1,000 km/s, 900 km/s, etc., which is not limited in the present disclosure.

It is to be noted that the second set threshold may be less than the first set threshold.

It is also to be noted that the first set threshold and the second set threshold may be determined based on a large number of experiments.

In the embodiments of the present disclosure, for any one of the grid cells, according to each of the first velocities and the target velocities of the grid cells, the wave velocity variation trend of the grid cell may be determined.

For example, assuming there is a grid cell A, there are three detection cycles preceding the target detection cycle. According to a chronological order of the detection cycles, they are a detection cycle 1, a detection cycle 2, a detection cycle 3, and the target detection cycle, respectively. In case that the first velocity of the grid cell A in the detection cycle 1 is 1,089 km/s, the first velocity of the grid cell A in the detection cycle 2 is 1,200 km/s, the first velocity of the grid cell A in the detection cycle 3 is 1,300 km/s, and the first velocity of the grid cell A in the target detection cycle is 1,600 km/s, it may be determined that the wave velocity variation trend of the grid cell is the upward trend.

The above-mentioned example merely takes an example that the wave velocity variation trend of the grid cell is the upward trend. In practical applications, there may be cases where a wave velocity variation trend of the grid cell is an upward trend first and then a downward trend, and a downward trend, etc., which is not limited in the present disclosure.

In the embodiments of the present disclosure, when the wave velocity variation trend of the grid cell is the upward trend and the target velocity of the grid cell is greater than the first set threshold, it may be determined that the grid cell is the structural abnormal cell. When the wave velocity variation trend of the grid cell is the upward trend first and then the downward trend and the target velocity of the grid cell is greater than the second set threshold, it may be determined that the grid cell is the structural abnormal cell.

Therefore, it may be effectively determined whether each of the grid cells in the target detection area is the structural abnormal cell.

In a possible implementation of the embodiments of the present disclosure, after it is determined that the grid cell is the structural abnormal cell, in response to the wave velocity variation trend of the grid cell being the upward trend and the target velocity being greater than the first set threshold, a cycle duration of a detection cycle following the target detection cycle may be updated. For example, the cycle duration of the target detection cycle is 3 days. After it is determined that the grid cell is the structural abnormal cell, in response to the wave velocity variation trend of the grid cell being the upward trend and the target velocity being greater than the first set threshold, the cycle duration of the detection cycle following the target detection cycle may be adjusted to 2 days, 24 hours, etc. Therefore, the duration of the detection cycle may be adjusted to detect the structure of the coal and rock mass in a shorter detection cycle, providing assistance for safe coal mining.

In step 104, according to the structural abnormal cells, a range of the structural abnormal area of the coal and rock mass in the target detection cycle is determined in the target velocity inversion map.

In embodiments of the present disclosure, according to the structural abnormal cells, the range of the structural abnormal area of the coal and rock mass in the target detection cycle may be determined in the target velocity inversion map.

In the method for detecting the structural abnormal area of the coal and rock mass provided in the embodiments of the disclosure, the target velocity inversion map of the coal and rock mass in the target detection cycle is acquired. The target velocity inversion map is configured to indicate the target velocity of the seismic wave propagation in each of the grid cells in the target detection area. The first velocity of the seismic wave propagation in any one of the grid cells in the at least one detection cycle preceding the target detection cycle is acquired. According to each of the first velocities and the target velocities, the structural abnormal cells are determined from each of the grid cells. According to the structural abnormal cells, the range of the structural abnormal area of the coal and rock mass in the target detection cycle is determined in the target velocity inversion map. Therefore, the range of the structural abnormal area of the coal and rock mass may be effectively and accurately determined based on a velocity distribution of seismic waves in the coal and rock mass.

It is understandable that coal mining needs digital storage, display and application of the coal and rock mass structure in real engineering environments, and needs a geological exploration method and device to meet new requirements, such as stable and repeated excitation of seismic waves, controllable waveform and propagation direction, and long-term continuous monitoring and imaging of specific areas.

However, in related technologies, seismic exploration is often configured to monitor the coal and rock mass structure in coal mines, and seismic sources of the seismic exploration are divided into explosive seismic sources and non-explosive seismic sources. The explosive seismic sources are most widely used in the seismic exploration. However, the explosive seismic sources pollute the environment to a certain extent, and the use and transportation of explosives are strictly controlled. Therefore, the explosive seismic sources cannot guarantee the monitoring of the coal and rock mass structure in an entire life cycle of mine. The non-explosive seismic sources mainly include a hammering seismic source, a seismic source vehicle, an air gun seismic source, an electric spark seismic source, etc. The hammering seismic source has a limited excitation energy and is easily affected by the environment. The hammering effect on dry and loose ground is very poor, which cannot meet the requirements of the monitoring of a deep coal and rock mass structure. Low-frequency effective seismic signals of the seismic source vehicle are easily disturbed by surface wave signals with a strong energy, a low apparent velocity and a long vibration duration. The air gun seismic source is generally used in oceans or land waters. The electric spark seismic source needs to drill a hole to an aquifer to ensure excitation in a water environment. Water medium is easy to affect an electric spark excitation energy, and an electrode often cannot fully vaporize water. At the same time, repeated excitation of the electric spark seismic source is easy to cause a surrounding rock to crack, resulting in poor stability of a seismic wave wavelet waveform. It may be seen that none of the above-mentioned engineering geophysical exploration method and the engineering geophysical exploration device may stably monitor the coal and rock mass structure of the mine for a long time.

Figure 2:
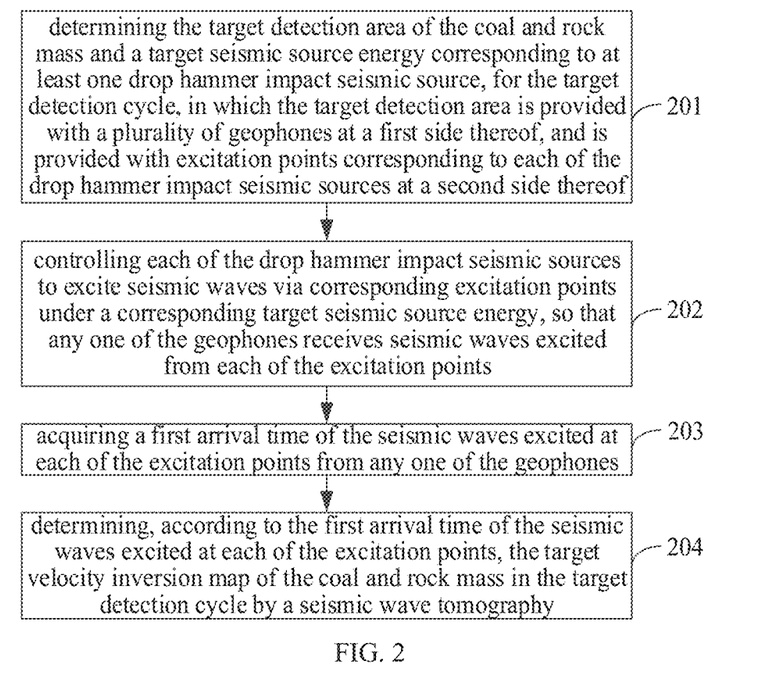
FIG. 2 is a flow chart of the method for detecting a structural abnormal area of a coal and rock mass provided in another embodiment of the present disclosure.

In view of problems existing in the above-mentioned engineering geophysical exploration method and the engineering geophysical exploration device, the present disclosure further provides a method for detecting a structural abnormal area of a coal and rock mass. FIG. 2 is a flow chart of a method for detecting a structural abnormal area of a coal and rock mass provided in another embodiment of the present disclosure. In embodiments shown in FIG. 2, a target velocity inversion map of the coal and rock mass in a target detection cycle may be acquired by a device of a drop hammer impact seismic source provided in the present disclosure.

As shown in FIG. 2, based on the above-mentioned embodiments of the present disclosure, the method for detecting the structural abnormal area of the coal and rock mass may further include steps as follows.

In step 201, for the target detection cycle, the target detection area of the coal and rock mass and a target seismic source energy corresponding to at least one drop hammer impact seismic source are determined. The target detection area is provided with a plurality of geophones at a first side thereof, and is provided with excitation points corresponding to each of the drop hammer impact seismic sources at a second side thereof.

It is to be noted that the explanation of the target detection area in step 101 is also applicable to this embodiment, which will not be elaborated herein.

In a possible implementation of the embodiments of the present disclosure, the drop hammer impact seismic source may include a transmitter component, a control component, a hydraulic station, an evacuation device, a high-pressure nitrogen cylinder, an anvil and an accessory vehicle. The transmitter component may further includes an air chamber, an inlet pipe, a transmitting pipe, a support and a control valve.

Figure 3:
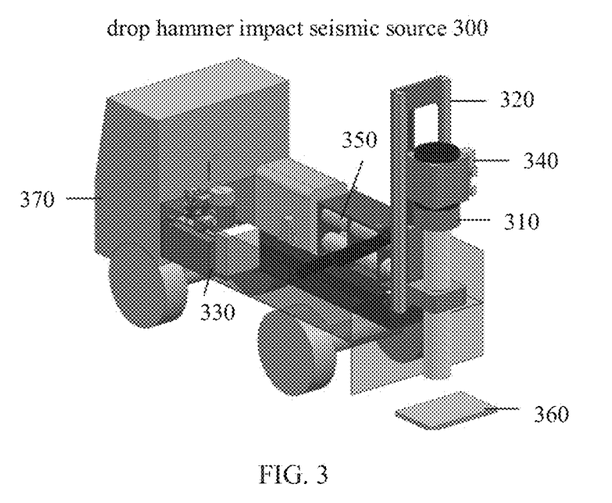
FIG. 3 is a schematic diagram of a device of a drop hammer impact seismic source provided in the present disclosure.

In an example, FIG. 3 is a schematic diagram of a device of a drop hammer impact seismic source provided in the present disclosure. As shown in FIG. 3, the drop hammer impact seismic source 300 may include a transmitter component 310, a control component 320, a hydraulic station 330, an evacuation device 340, a high-pressure nitrogen cylinder 350, an anvil 360 and an accessory vehicle 370.

1. The transmitter component 310 may be disposed on the accessory vehicle 370, and may be configured to transmit a bullet to the anvil 360 located below the bullet, so as to generate seismic waves via the impact of the bullet on the anvil 360. The transmitter component 310 may include the bullet.

The anvil 360 may be a rectangular steel plate and may be located below the bullet. Therefore, in an impact operation, the anvil may effectively avoid a problem of ground collapse caused by the impact of the bullet on the ground.

The shape of the bullet may be, but is not limited to, cylindrical.

Figure 4:
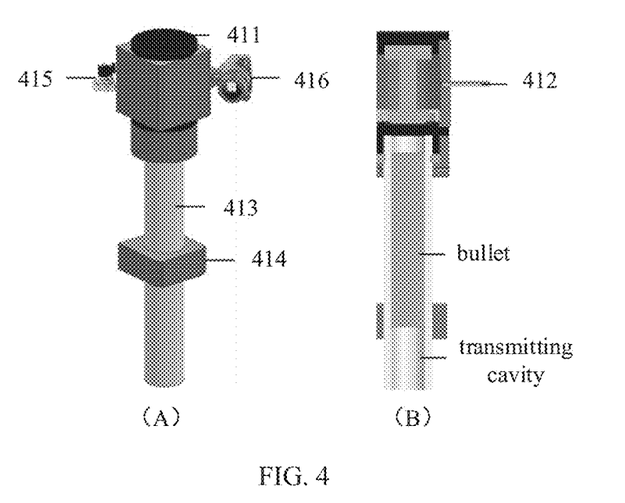
FIG. 4 is a schematic diagram of the transmitter component provided in the present disclosure.

As shown in FIGS. 4(A) and 4(B), the transmitter component 310 may further includes an air chamber 411, an inlet pipe 412, a transmitting pipe 413, a support 414 and a control valve 415. FIG. 4(A) is a perspective view of the transmitter component, and FIG. 4(B) is a cross-sectional view of the transmitter component.

The air chamber 411 is a closed cylindrical cylinder, which may be connected with the high-pressure nitrogen cylinder 350 via the inlet pipe 412, so that a pressure energy of compressed nitrogen input into the air chamber 411 from the high-pressure nitrogen cylinder 350 is converted into a kinetic energy of the bullet in the air chamber 411. It is to be noted that an inner wall of the air chamber 411 may be provided with threads to be connected with the transmitting pipe 413 via the threads.

The transmitting pipe 413 may be provided with an air outlet to exchange air with an external environment of the transmitter component 310 via the air outlet. The transmitting pipe 413 may include a transmitting cavity, and the bullet may be disposed in the transmitting cavity.

The transmitting pipe 413 may be made of, but is not limited to, an alloy steel, which is not limited in the present disclosure.

It is to be noted that, in order to ensure a normal movement of the bullet, an inner wall of the transmitting cavity may be smooth.

The support 414 may be connected with the control component 320 for jointly controlling a movement of the transmitter component 310 with the control component 320. It is to be noted that the support 414 may be provided at a middle and lower part of the transmitting pipe 413.

The control valve 415 may be configured to control the gas in the air chamber flowing from the air chamber 411 to the transmitting pipe 413. It is to be noted that the control valve 415 may be, but is not limited to, a solenoid valve, a pneumatic valve, etc., which is not limited in the present disclosure.

The transmitter component 310 may further include a pressure transmitter 416. The pressure transmitter 416 may be configured to control a gas pressure of the gas in the air chamber flowing from the air chamber 411 to the transmitting pipe 413.

2. The control component 320 is connected with the transmitter component 310 and may be configured to control the movement of the transmitter component 310.

It is to be noted that a movement mode of the transmitter component 310 may be, but is not limited to, an upward movement, a downward movement, a forward movement, a backward movement, etc.

Figure 5:
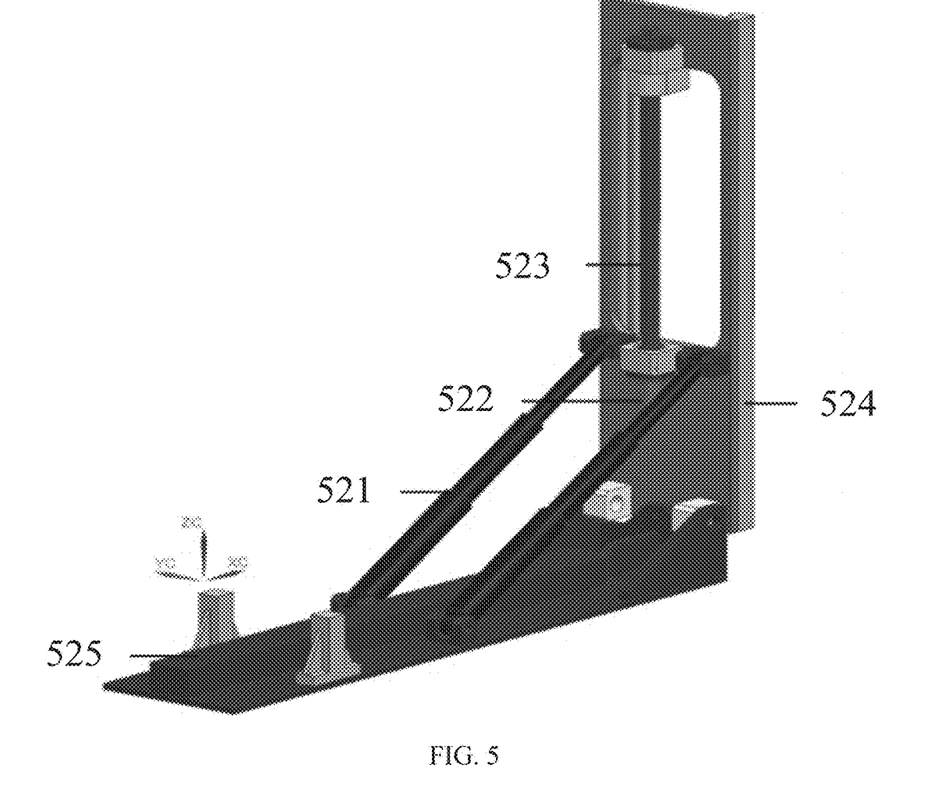
FIG. 5 is a schematic diagram of a control component provided in the present disclosure.

As shown in FIG. 5, the control component 320 may include a hydraulic cylinder 521, a motor 522, a screw rod 523, a motion support frame 524 and a base 525.

The screw rod 523 and the support 414 in the transmitter component 310 may be installed on the motion support frame 524. The motion support frame 524 may be connected with the base 525. The hydraulic cylinder 521 may be connected with the base 525 and the motion support frame 524. The motor 522 may be connected with the screw rod 523.

It may be understood that the control component 320 may be fixed on the accessory vehicle 370. For example, the control component 320 may be fixed on the accessory vehicle 370 via screws.

The hydraulic cylinder 521 may be configured to adjust an angle of a first included angle between the motion support frame 524 and the base 525 by controlling the expansion and contraction of a hydraulic rod in the hydraulic cylinder 521, so that an angle of a second included angle between the transmitter component 310 and the ground may be adjusted. Values of the angle of the first included angle may range from, for example, 0° to 90°, 0° to 180°, etc., which is not limited in the present disclosure.

The motor 522 may be configured to adjust a distance between the transmitter component 310 and the ground by controlling an up and down movement of the screw rod 523.

3. The hydraulic station 330 may be connected with the control component 320 and may be configured to provide power for a movement of the control component 320.

The hydraulic station 330 may be connected with the hydraulic cylinder 521 and the motor 522, and is configured to provide power to the hydraulic cylinder 521 and the motor 522, respectively.

4. The evacuation device 340 is connected with the transmitter component 310, and may be configured to evacuate the air in the transmitter component 310 after the bullet is fired, so that the bullet may return to a transmitting position of the transmitter component again.

The evacuation device 340 may be connected with the transmitting pipe 413, and is configured to evacuate the air in the transmitting cavity after the bullet is fired, so that the bullet may return to the transmitting position of the transmitter component 310 again.

The drop hammer impact seismic source 300 may further include a gas flow rate control valve. The gas flow rate control valve may be provided in the evacuation device 340.

5. The high-pressure nitrogen cylinder 350 is connected to the transmitter component 310, and may be configured to provide power to the bullet via the compressed nitrogen in the high-pressure nitrogen cylinder.

The drop hammer impact seismic source 300 may further include an electronic control system. The electronic control system may be connected with the transmitter component 310 and may be configured to control the compressed nitrogen delivered from the high-pressure nitrogen cylinder 350 to the transmitter component 310.

In the embodiments of the present disclosure, the number of drop hammer impact seismic sources may be, but is not limited to, one.

In the embodiments of the present disclosure, the target detection area is provided with a plurality of geophones at a first side thereof, and is provided with excitation points corresponding to each of the drop hammer impact seismic sources at a second side thereof.

In the embodiments of the present disclosure, for the target detection cycle, the target detection area of the coal and rock mass and the target seismic source energy corresponding to the at least one drop hammer impact seismic source may be determined.

In order to determine the target seismic source energy corresponding to the at least one drop hammer impact seismic source, in a possible implementation of the embodiments of the present disclosure, the target detection area has a corresponding coal detection depth. The drop hammer impact seismic source includes a transmitter component, a control component, a hydraulic station, an evacuation device, a high-pressure nitrogen cylinder, an anvil and an accessory vehicle. The transmitter component further includes an air chamber, an inlet pipe, a transmitting pipe, a support and a control valve. The coal detection depth of the target detection area may be acquired. For any one of the drop hammer impact seismic sources, a gas pressure in the air chamber, a bullet diameter and a bullet length in the drop hammer impact seismic source may be adjusted according to the coal detection depth, so as to obtain the target seismic source energy of the drop hammer impact seismic source.

In an example, after the coal detection depth of the target detection area is acquired, the target seismic source energy corresponding to the coal detection depth may be queried according to the coal detection depth. An impact velocity of the bullet hitting the anvil is determined based on the target seismic source energy and a bullet mass. An impact acceleration of the bullet is determined based on the impact velocity. The gas pressure in the air chamber is determined according to the impact acceleration and a diameter of the inlet pipe.

For example, a correspondence between the coal detection depth and the seismic source energy may be established in advance and stored, so that when the coal detection depth is determined, the target seismic source energy corresponding to the coal detection depth may be acquired by querying the correspondence. Assuming that the target seismic source energy is E and the bullet mass is m, the impact velocity v of the bullet hitting the anvil may be determined according to:

$$v = \sqrt{\frac{2E}{m}}; \tag{1}$$

Assuming that the bullet diameter is d, the bullet length is h and a bullet density is ρ, the bullet mass m may be determined according to:

$$m = \pi \left(\frac{d}{2}\right)^2 h\rho; \tag{2}$$

After determining the impact velocity v of the bullet hitting the anvil, according to the impact velocity v, the impact acceleration a of the bullet may be determined according to:

$$a = \frac{2v}{t^2}; \tag{3}$$

Assuming that the diameter of the inlet pipe is D, the gas pressure P in the air chamber may be determined according to:

$$P = \frac{4(a-g)}{\pi D^2 \eta}; \tag{4}$$

where g is an acceleration of gravity, η is the efficiency of the air chamber in doing work on the bullet and may be preset.

Therefore, the gas pressure in the air chamber, the bullet diameter and the bullet length may be adjusted according to the coal detection depth, and the target seismic source energy of the drop hammer impact seismic source may be effectively obtained.

In step 202, each of the drop hammer impact seismic sources is controlled to excite seismic waves via corresponding excitation points under a corresponding target seismic source energy, so that any one of the geophones receives seismic waves excited from each of the excitation points.

In embodiments of the present disclosure, each of the drop hammer impact seismic sources may be controlled to excite the seismic waves via the corresponding excitation points under the corresponding target seismic source energy, so that any one of the geophones receives the seismic waves excited from each of the excitation points.

In step 203, a first arrival time of the seismic waves excited at each of the excitation points is acquired from any one of the geophones.

In embodiments of the present disclosure, the first arrival time may be an actual time when any one of the geophones picks up a first arrival wave of the seismic waves.

In embodiments of the present disclosure, after each of the geophones receives the seismic waves excited from each of the excitation points, the first arrival time of the seismic waves excited at each of the excitation points may be acquired from any one of the geophones.

In step 204, according to the first arrival time of the seismic waves excited at each of the excitation points, the target velocity inversion map of the coal and rock mass in the target detection cycle is determined by a seismic wave tomography.

In embodiments of the present disclosure, in the target detection cycle, according to the first arrival time of the seismic waves excited at each of the excitation points, wave velocities of the seismic waves may be inversely analyzed by the seismic wave tomography to determine a velocity distribution of the target velocity of the seismic wave propagation in the grid cell in the target detection area, and the target velocity inversion map corresponding to the velocity distribution may be determined according to the velocity distribution of the seismic waves in the target detection area.

In order to clearly illustrate how to determine the target velocity inversion map of the coal and rock mass in the target detection cycle by the seismic wave tomography according to the first arrival time of the seismic waves excited at each of the excitation points, in a possible implementation of the embodiments of the present disclosure, the following steps may be adopted to determine the target velocity inversion map of the coal and rock mass in the target detection cycle.

In step 2041, an initial velocity model is established. Each of the grid cells in the target detection area has a corresponding initial velocity.

In embodiments of the present disclosure, the initial velocity model may be established. The initial velocity model may be a constant velocity model, a variable velocity model, etc., which is not limited in the present disclosure.

In an example, when the initial velocity model is the constant velocity model. For example, the constant velocity model of the initial velocity model is:

$$V(i,j)=k; \quad (5).$$

The target detection area is divided into N rows and M columns of grid cells, where i=1, 2, ..., N, j=1, 2, ..., M. $V(i,j)$ is an initial velocity corresponding to a grid cell in a $i^{th}$ row and $j^{th}$ column in the target detection area, and k is a constant.

In another example, when the initial velocity model is the variable velocity model. For example, the variable velocity model of the initial velocity model is:

$$V(i,j)=v_0+bi; \quad (6)$$

The target detection area is divided into N rows and M columns of grid cells, where i=1, 2, ..., N, j=1, 2, ..., M. $V(i,j)$ is an initial velocity corresponding to a grid cell in a $i^{th}$ row and $j^{th}$ column in the target detection area, and $v_0$ and b are constants.

It is to be noted that the above-mentioned examples of the initial velocity model are merely illustrative. In practical applications, those skilled in the art may determine the initial velocity model of the target detection area according to geological data information, geophysical information, etc. Moreover, the closer the initial velocity in the initial velocity model is to a real wave velocity of the seismic waves in the coal and rock mass, the faster a convergence velocity of the model will be in subsequent data processing, and the accuracy of detecting the structural abnormal area of the coal and rock mass may be improved.

In step 2042, according to the initial velocity and the first arrival time, multiple rounds of iterative inversion calculations are performed on the initial velocity model to update the initial velocity in the initial velocity model to the target velocity.

In embodiments of the present disclosure, according to the initial velocity corresponding to each of the grid cells and the first arrival time of the seismic waves excited at each of the excitation points, multiple rounds of iterative inversion may be performed on the initial velocity model to update the initial velocity of the seismic waves in each of the grid cells in the initial velocity model to the target velocity.

In a possible implementation of the embodiments of the present disclosure, for any round of iterative inversion process, each ray path may be ray traced according to an initial velocity adopted in this round, and a first ray path length of each ray path of this round, each grid cell through which each ray path of this round passes, and a first reference duration needed for this round to propagate seismic waves along each ray path may be determined. A first travel time residual of this round and a first loss function of this round are determined according to the first arrival time and the first reference duration of this round. In case that a value of the first loss function of this round is greater than a third set threshold, a first slowness update amount of any grid cell in this round may be determined according to the first travel time residual and the first ray path length of this round. The initial velocity may be updated to the reciprocal of the sum of the first slowness update amount and a first initial slowness, and an updated initial velocity may be taken as an initial velocity adopted in a next round. The first slowness update amount of this round is configured to indicate an update amount of the first initial slowness of this round, and the first initial slowness of this round is the reciprocal of the initial velocity of this round. In case that a value of the first loss function of this round is not greater than a third set threshold, the iterative inversion of the initial velocity model is stopped, and the updated initial velocity may be taken as the target velocity.

In the above-mentioned possible implementations, for any round of iterative inversion process, a specific process may include steps as follows.

1) Each ray path may be ray traced according to an initial velocity adopted in this round, and a first ray path length of each ray path of this round, each grid cell through which each ray path passes, and a first reference duration needed for propagating seismic waves along each ray path may be determined.

In the embodiments of the present disclosure, according to the geometric seismology theory, the ray path may indicate a path of the seismic wave from any excitation point to any geophone.

It is to be noted that the number of ray paths may be determined according to the number of excitation points and the number of geophones. For example, in case that the number of excitation points is N and the number of geophones is M, the number of ray paths is M*N.

It may be understood that in order to facilitate the subsequent data processing, each ray path may be numbered.

For example, assuming that the number of excitation points is 3, i.e., excitation point 1, excitation point 2 and excitation point 3, and the number of geophones is 4, i.e., geophone 1, geophone 2, geophone 3 and geophone 4, the number of corresponding ray paths is 12. A corresponding ray path between the excitation point 1 and the geophone 1 may be set to 1, a corresponding ray path between the excitation point 1 and the geophone 2 is set to 2, and a corresponding ray path between the excitation point 1 and the geophone 3 is set to 3. Corresponding ray paths between the excitation points and the geophones may be numbered in sequence in the above-mentioned manner, which will not be elaborated herein.

In the embodiments of the present disclosure, each ray path may be ray traced. For example, each ray path may be ray traced based on a ray tracing algorithm, such as a shortest path method, a finite difference method, or a linear traveltime interpolation (abbreviated as LTI).

Therefore, in the present disclosure, for any round of iterative inversion process, each ray path may be ray traced according to the initial velocity adopted in this round, and the first ray path length of each ray path of this round, each grid cell through which each ray path passes and the first reference duration needed for propagating the seismic waves along each ray path may be determined.

In an example, assuming that there are 50 ray paths, for any round of iterative inversion process, the 50 ray paths may be ray traced according to the first initial velocity adopted in this round, so as to determine a first ray path length of the 50 ray paths of this round, each of grid cells through which the 50 ray paths pass and a first reference duration needed for propagating seismic waves along each ray path.

For example, in any round of iterative inversion process, ray tracing is performed on each ray path according to the initial velocity adopted in this round, and the first ray path length of each ray path of this round is determined to be $L_i$, each grid cell through which each ray path passes is determined, and the first reference duration needed for propagating the seismic waves along each ray path is determined to be $T_i$, where i=1, 2, . . . , N, and the number of ray paths is N.

2) A first travel time residual of this round and a first loss function of this round are determined according to the first arrival time and the first reference duration of this round.

In embodiments of the present disclosure, the first travel time residual of this round may be determined according to the first arrival time and the first reference duration of this round.

For example, in case that a first arrival time of seismic waves from any excitation point to any geophone is $T_{0i}$, and its corresponding first reference duration is $T_i$, its corresponding travel time residual $\Delta T_i$ is $T_{0i}$-$T_i$, where i=1, 2, . . . , N, and N represents the number of ray paths.

In embodiments of the present disclosure, the first loss function may be a function determined according to the travel time residual.

In an example, still taking the above-mentioned example as an example, the first loss function may be, for example:

$$F = \sqrt{\frac{\sum_{i=1}^{N}(\Delta T_i)^2}{N}}; \quad (7)$$

3) It is determined whether a value of the first loss function of this round is greater than a third set threshold. In case that the value of the first loss function of this round is greater than the third set threshold, steps 4) to 5) may be performed. In case that the value of the first loss function of this round is not greater than the third set threshold, step 6) may be performed.

In embodiments of the present disclosure, the third set threshold may be preset. For example, the third set threshold is 1.0e-2 (or 0.01), 1.0e-3 (or 0.001), etc., which is not limited in the present disclosure.

4) A first slowness update amount of any grid cell in this round is determined according to the first travel time residual and the first ray path length of this round.

The first slowness update amount of this round may be configured to indicate an update amount of a first initial slowness of this round, and the first initial slowness of this round is the reciprocal of the initial velocity of this round.

In embodiments of the present disclosure, the first slowness update amount of any grid cell in this round may be determined according to the first travel time residual and the first ray path length of this round.

For example, the first slowness update amount$\Delta S$ (m,n) of any grid cell in this round is:

$$\Delta S(m, n) = \frac{1}{K}\sum_{i=1}^{N}\frac{\Delta T_i}{L_i}; \quad (8)$$

where $\Delta T_i$ is a travel time residual corresponding to a $i^{th}$ ray path, $L_i$ is a first ray path length of the $i^{th}$ ray path, and K is the number of rays passing through a grid cell at a (m,n) position.

5) The initial velocity is updated to the reciprocal of the sum of the first slowness update amount and a first initial slowness, and an updated initial velocity may be taken as an initial velocity adopted in a next round.

In embodiments of the present disclosure, the initial velocity of any grid cell may be updated to the reciprocal of the sum of the first slowness update amount of any grid cell and the first initial slowness of any grid cell.

For example, the first slowness update amount of any grid cell is $\Delta S$, the initial velocity of any grid cell is $v^{old}$, and the first initial slowness of any grid is:

$$S^{old} = \frac{1}{v^{old}}; \quad (9)$$

The initial velocity of any grid cell is updated to:

$$v^{new} = \frac{1}{S^{old} + \Delta S}; \quad (10)$$

In the embodiments of the present disclosure, in case that the first loss function of this round is greater than the third set threshold, the updated initial velocity may be taken as the initial velocity adopted in the next round.

6) In case that a value of the first loss function of this round is not greater than a third set threshold, the iterative inversion of the initial velocity model may be stopped, and the updated initial velocity may be taken as the target velocity.

It is to be noted that the above-mentioned illustration is merely given that a termination condition of the iterative inversion of the model is that the value of the first loss function is not greater than the third set threshold. In practical applications, other termination conditions may also be set. For example, the termination condition may be that the number of iterations reaches a set number threshold, an iterative inversion duration is greater than a set duration threshold, etc., which is not limited in the present disclosure.

Therefore, the initial velocity in the initial velocity model may be updated to the target velocity.

In step 2043, the target velocity inversion map of the target detection area in the target detection cycle is acquired according to the target velocity.

In embodiments of the present disclosure, the target velocity inversion map of the target detection area in the target detection cycle may be acquired according to the target velocity of each grid cell in the target detection area.

In the method for detecting the structural abnormal area of the coal and rock mass provided in the embodiments of the present disclosure, for the target detection cycle, the target detection area of the coal and rock mass and the target seismic source energy corresponding to the at least one drop hammer impact seismic source are determined. The target detection area is provided with the plurality of geophones at the first side thereof, and is provided with the excitation points corresponding to each of the drop hammer impact seismic sources at the second side thereof. Each of the drop hammer impact seismic sources is controlled to excite the seismic waves via the corresponding excitation points under the corresponding target seismic source energy, so that any one of the geophones receives the seismic waves excited from each of the excitation points. The first arrival time of the seismic waves excited at each of the excitation points is acquired from any one of the geophones. According to the first arrival time of the seismic waves excited at each of the excitation points, the target velocity inversion map of the coal and rock mass in the target detection cycle is determined by the seismic wave tomography. Therefore, on the one hand, the use of the drop hammer impact seismic source may stably and periodically excite the seismic waves, enabling long-term dynamic monitoring or detection of the coal and rock mass structure, so that a dynamic velocity inversion map of the coal and rock mass structure may be provided for relevant staff to assist in solving problems related to rock stratum control in mining engineering. On the other hand, the velocity inversion map and the velocity distribution of the seismic waves in the coal and rock mass may be effectively acquired by the seismic wave tomography.

Corresponding to the method for detecting the structural abnormal area of the coal and rock mass provided in the above-mentioned embodiments of FIGS. 1 to 2, the present disclosure also provides a device for detecting a structural abnormal area of a coal and rock mass. Since the device for detecting the structural abnormal area of the coal and rock mass provided in embodiments of the present disclosure corresponds to the method for detecting the structural abnormal area of the coal and rock mass provided in the above-mentioned embodiments of FIGS. 1 to 2, the implementation of the method for detecting the structural abnormal area of the coal and rock mass is also applicable to the device for detecting the structural abnormal area of the coal and rock mass provided in the embodiments of the present disclosure, which will not be elaborated in the embodiments of the present disclosure.

Figure 6:
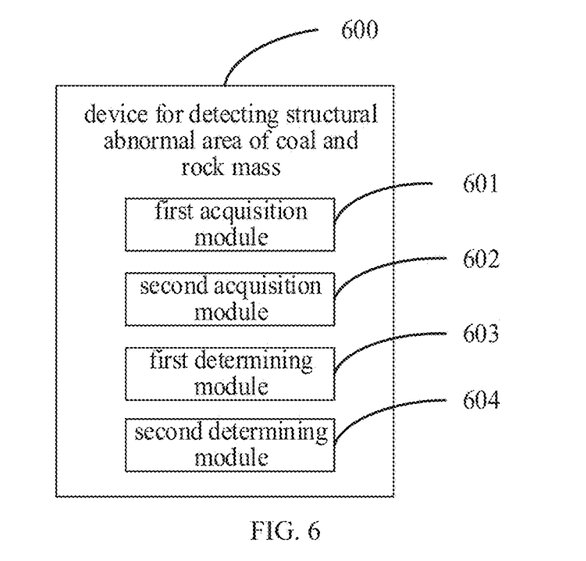
FIG. 6 is a schematic diagram of a device for detecting a structural abnormal area of a coal and rock mass provided in another embodiment of the present disclosure.

FIG. 6 is a schematic diagram of a device for detecting a structural abnormal area of a coal and rock mass provided in another embodiment of the present disclosure.

As shown in FIG. 6, a device 600 for detecting a structural abnormal area of a coal and rock mass may include a first acquisition module 601, a second acquisition module 602, a first determining module 603 and a second determining module 604.

The first acquisition module 601 is configured to acquire a target velocity inversion map of the coal and rock mass in a target detection cycle. The target velocity inversion map is configured to indicate a target velocity of seismic wave propagation in each of grid cells in a target detection area.

The second acquisition module 602 is configured to acquire a first velocity of seismic wave propagation in any one of the grid cells in at least one detection cycle preceding the target detection cycle.

The first determining module 603 is configured to determine, according to each of the first velocities and the target velocities, structural abnormal cells from each of the grid cells.

The second determining module 604 is configured to determine, according to the structural abnormal cells, a range of the structural abnormal area of the coal and rock mass in the target detection cycle in the target velocity inversion map.

In a possible implementation of the embodiments of the present disclosure, the first determining module 603 is configured to, for any one of the grid cells, determine, according to each of the first velocities and the target velocities of the grid cells, a wave velocity variation trend of the grid cell. It is determined that the grid cell is the structural abnormal cell, in response to the wave velocity variation trend of the grid cell being an upward trend and the target velocity being greater than a first set threshold In a possible implementation of the embodiments of the present disclosure, the device 600 for detecting the structural abnormal area of the coal and rock mass may include a third determining module configured to determine that the grid cell is the structural abnormal cell, in response to the wave velocity variation trend of the grid cell being an upward trend first and then a downward trend and the target velocity being greater than a second set threshold. The second set threshold is less than the first set threshold.

In a possible implementation of the embodiments of the present disclosure, the device 600 for detecting the structural abnormal area of the coal and rock mass may include an updating module configured to update a cycle duration of a detection cycle following the target detection cycle.

In a possible implementation of the embodiments of the present disclosure, the first acquisition module 601 is configured to determine the target detection area of the coal and rock mass and a target seismic source energy corresponding to at least one drop hammer impact seismic source, for the target detection cycle. The target detection area is provided with a plurality of geophones at a first side thereof, and is provided with excitation points corresponding to each of the drop hammer impact seismic sources at a second side thereof. The first acquisition module 601 is configured to control each of the drop hammer impact seismic sources to excite seismic waves via corresponding excitation points under a corresponding target seismic source energy, so that any one of the geophones receives seismic waves excited from each of the excitation points. The first acquisition module 601 is configured to acquire a first arrival time of the seismic waves excited at each of the excitation points from any one of the geophones. The first acquisition module 601 is configured to determine, according to the first arrival time of the seismic waves excited at each of the excitation points, the target velocity inversion map of the coal and rock mass in the target detection cycle by a seismic wave tomography.

In a possible implementation of the embodiments of the present disclosure, the first acquisition module 601 is configured to establish an initial velocity model. Each of the grid cells in the target detection area has a corresponding initial velocity. The first acquisition module 601 is configured to perform, according to the initial velocity and the first arrival time, multiple rounds of iterative inversion calculations on the initial velocity model to update the initial velocity in the initial velocity model to the target velocity. The first acquisition module 601 is configured to acquire, according to the target velocity, the target velocity inversion map of the target detection area in the target detection cycle.

In a possible implementation of the embodiments of the present disclosure, the target detection area has a corresponding coal detection depth. The drop hammer impact seismic source includes a transmitter component, a control component, a hydraulic station, an evacuation device, a high-pressure nitrogen cylinder, an anvil and an accessory vehicle. The transmitter component includes an air chamber, an inlet pipe, a transmitting pipe, a support and a control valve. The first acquisition module 601 is configured to acquire the coal detection depth of the target detection area, and is configured to adjust, according to the coal detection depth, a gas pressure in the air chamber, a bullet diameter and a bullet length, for any one of the drop hammer impact seismic sources, so as to obtain the target seismic source energy.

According to the device for detecting the structural abnormal area of the coal and rock mass provided in the embodiment of the disclosure, the target velocity inversion map of the coal and rock mass in the target detection cycle is acquired. The target velocity inversion map is configured to indicate the target velocity of the seismic wave propagation in each of the grid cells in the target detection area. The first velocity of the seismic wave propagation in any one of the grid cells in the at least one detection cycle preceding the target detection cycle is acquired. According to each of the first velocities and the target velocities, the structural abnormal cells are determined from each of the grid cells. According to the structural abnormal cells, the range of the structural abnormal area of the coal and rock mass in the target detection cycle is determined in the target velocity inversion map. Therefore, the range of the structural abnormal area of the coal and rock mass may be effectively and accurately determined based on a velocity distribution of seismic waves in the coal and rock mass.

In order to implement the above-mentioned embodiments, the present disclosure further provides an electronic device. The electronic device may be a server or a detection device in the above-mentioned embodiments. The electronic device includes a memory, a processor, and a computer program stored in the memory and executable on the processor. The processor is configured to implement the method for detecting the structural abnormal area of the coal and rock mass provided in any of the above-mentioned embodiments of the present disclosure when running the computer program.

In order to implement the above-mentioned embodiments, the present disclosure further provides a non-transitory computer-readable storage medium. The non-transitory computer-readable storage medium has stored therein computer programs that, when executed by a processor, cause the method for detecting the structural abnormal area of the coal and rock mass provided in any of the above-mentioned embodiments of the present disclosure to be implemented.

In order to implement the above-mentioned embodiments, the present disclosure further provides a computer program product. The computer program product includes instructions that, when executed by a processor, causes the processor to implement the method for detecting the structural abnormal area of the coal and rock mass provided in any of the above-mentioned embodiments of the present disclosure.

Reference throughout this specification to terms "an embodiment," "some embodiments," "an example," "a specific example," or "some examples," mean that a particular feature, structure, material, or characteristic described in connection with the embodiment or example is included in at least one embodiment or example of the present disclosure. The schematic expressions of the above-mentioned terms throughout this specification are not necessarily referring to the same embodiment or example. Moreover, the particular features, structures, materials, or characteristics described may be combined in any suitable manner in one or more embodiments or examples. In addition, those skilled in the art may combine the different embodiments or examples and features of different embodiments or examples described in this specification without being mutually inconsistent.

In addition, terms such as "first" and "second" are used for purposes of description and are not intended to indicate or imply relative importance or significance or to imply the number of indicated technical features. Thus, the feature defined with "first" and "second" may explicitly or implicitly include at least one of these features. In the description of the present disclosure, "a plurality of" means at least two, such as two, three, etc., unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations. Functions may be performed out of an order shown or discussed, including in a substantially simultaneous manner or in a reverse order according to functions involved, which should be understood by those skilled in the art to which the embodiments of the present disclosure belong.

The logic and/or step described in other manners herein or shown in the flow chart, for example, a particular sequence table of executable instructions for realizing the logical function, may be specifically achieved in any computer readable medium to be used by an instruction execution system, device or equipment (such as a system based on computers, a system including processors or other systems capable of obtaining an instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (non-exhaustive list) of the computer readable medium include: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It is to be understood that each part of the present disclosure may be realized by the hardware, software, firmware or their combination. In the above-mentioned embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above-mentioned method embodiments may be achieved by commanding the related hardware with programs. The programs may be stored in a computer readable storage medium, and the programs include one or a combination of the steps in the method embodiments when executed.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, or optical disks, etc. Although the embodiments of the present disclosure have been shown and described above, it would be appreciated by those skilled in the art that the above-mentioned embodiments are exemplary and cannot be construed to limit the present disclosure, and changes, modifications, substitutions and variations may be made in the above-mentioned embodiments without departing from the scope of the present disclosure.

What is claimed is:

1. A method for detecting a structural abnormal area of a coal and rock mass, comprising:
    acquiring a target velocity inversion map of the coal and rock mass in a target detection cycle;
    wherein the target velocity inversion map is configured to indicate a target velocity of seismic wave propagation in each of grid cells in a target detection area;
    acquiring a first velocity of seismic wave propagation in any one of the grid cells in at least one detection cycle preceding the target detection cycle;
    determining, according to each of the first velocities and the target velocities, structural abnormal cells from each of the grid cells; and
    determining, according to the structural abnormal cells, a range of the structural abnormal area of the coal and rock mass in the target detection cycle in the target velocity inversion map;
    wherein determining, according to each of the first velocities and the target velocities, the structural abnormal cells from each of the grid cells comprises:
    for any one of the grid cells, determining, according to each of the first velocities and the target velocities of the grid cells, a wave velocity variation trend of the grid cell; and
    determining that the grid cell is the structural abnormal cell, in response to the wave velocity variation trend of the grid cell being an upward trend and the target velocity being greater than a first set threshold;
    wherein acquiring the target velocity inversion map of the coal and rock mass in the target detection cycle comprises:
    determining the target detection area of the coal and rock mass and a target seismic source energy corresponding to at least one drop hammer impact seismic source, for the target detection cycle; wherein the target detection area is provided with a plurality of geophones at a first side thereof, and is provided with excitation points corresponding to each of the drop hammer impact seismic sources at a second side thereof;
    controlling each of the drop hammer impact seismic sources to excite seismic waves via corresponding excitation points under a corresponding target seismic source energy, so that any one of the geophones receives seismic waves excited from each of the excitation points;
    acquiring a first arrival time of the seismic waves excited at each of the excitation points from any one of the geophones; and
    determining, according to the first arrival time of the seismic waves excited at each of the excitation points, the target velocity inversion map of the coal and rock mass in the target detection cycle by a seismic wave tomography;
    wherein determining, according to the first arrival time of the seismic waves excited at each of the excitation points, the target velocity inversion map of the coal and rock mass in the target detection cycle by the seismic wave tomography comprises:
    establishing an initial velocity model, wherein each of the grid cells in the target detection area has a corresponding initial velocity;
    performing, according to the initial velocity and the first arrival time, multiple rounds of iterative inversion calculations on the initial velocity model to update the initial velocity in the initial velocity model to the target velocity; and
    acquiring, according to the target velocity, the target velocity inversion map of the target detection area in the target detection cycle.

2. The method of claim 1, further comprising:
    determining that the grid cell is the structural abnormal cell, in response to the wave velocity variation trend of the grid cell being an upward trend first and then a downward trend and the target velocity being greater than a second set threshold; wherein the second set threshold is less than the first set threshold.

3. The method of claim 1, wherein the method further comprises:
    updating a cycle duration of a detection cycle following the target detection cycle.

4. The method of claim 1, wherein the target detection area has a corresponding coal detection depth; the drop hammer impact seismic source comprises a transmitter component, a control component, a hydraulic station, an evacuation device, a high-pressure nitrogen cylinder, an anvil and an accessory vehicle; wherein the transmitter component comprises an air chamber, an inlet pipe, a transmitting pipe, a support and a control valve;
    wherein determining the target seismic source energy corresponding to the at least one drop hammer impact seismic source comprises:
    acquiring the coal detection depth of the target detection area; and
    adjusting, according to the coal detection depth, a gas pressure in the air chamber, a bullet diameter and a bullet length, for any one of the drop hammer impact seismic sources, so as to obtain the target seismic source energy.

5. An electronic device, comprising:
a memory;
a processor; and
a computer program stored in the memory and executable on the processor,
wherein the processor is configured to implement the following operations when running the computer program:
acquiring a target velocity inversion map of a coal and rock mass in a target detection cycle;
wherein the target velocity inversion map is configured to indicate a target velocity of seismic wave propagation in each of grid cells in a target detection area;
acquiring a first velocity of seismic wave propagation in any one of the grid cells in at least one detection cycle preceding the target detection cycle;
determining, according to each of the first velocities and the target velocities, structural abnormal cells from each of the grid cells; and
determining, according to the structural abnormal cells, a range of a structural abnormal area of the coal and rock mass in the target detection cycle in the target velocity inversion map;
wherein determining, according to each of the first velocities and the target velocities, the structural abnormal cells from each of the grid cells comprises:
for any one of the grid cells, determining, according to each of the first velocities and the target velocities of the grid cells, a wave velocity variation trend of the grid cell; and
determining that the grid cell is the structural abnormal cell, in response to the wave velocity variation trend of the grid cell being an upward trend and the target velocity being greater than a first set threshold;
wherein acquiring the target velocity inversion map of the coal and rock mass in the target detection cycle comprises:
determining the target detection area of the coal and rock mass and a target seismic source energy corresponding to at least one drop hammer impact seismic source, for the target detection cycle; wherein the target detection area is provided with a plurality of geophones at a first side thereof, and is provided with excitation points corresponding to each of the drop hammer impact seismic sources at a second side thereof;
controlling each of the drop hammer impact seismic sources to excite seismic waves via corresponding excitation points under a corresponding target seismic source energy, so that any one of the geophones receives seismic waves excited from each of the excitation points;
acquiring a first arrival time of the seismic waves excited at each of the excitation points from any one of the geophones; and
determining, according to the first arrival time of the seismic waves excited at each of the excitation points, the target velocity inversion map of the coal and rock mass in the target detection cycle by a seismic wave tomography;
wherein determining, according to the first arrival time of the seismic waves excited at each of the excitation points, the target velocity inversion map of the coal and rock mass in the target detection cycle by the seismic wave tomography comprises:

establishing an initial velocity model, wherein each of the grid cells in the target detection area has a corresponding initial velocity;
performing, according to the initial velocity and the first arrival time, multiple rounds of iterative inversion calculations on the initial velocity model to update the initial velocity in the initial velocity model to the target velocity; and
acquiring, according to the target velocity, the target velocity inversion map of the target detection area in the target detection cycle.

6. The electronic device of claim 5, wherein the processor is configured to:
determine that the grid cell is the structural abnormal cell, in response to the wave velocity variation trend of the grid cell being an upward trend first and then a downward trend and the target velocity being greater than a second set threshold; wherein the second set threshold is less than the first set threshold.

7. The electronic device of claim 5, wherein the processor is configured to:
update a cycle duration of a detection cycle following the target detection cycle.

8. The electronic device of claim 5, wherein the target detection area has a corresponding coal detection depth; the drop hammer impact seismic source comprises a transmitter component, a control component, a hydraulic station, an evacuation device, a high-pressure nitrogen cylinder, an anvil and an accessory vehicle; wherein the transmitter component comprises an air chamber, an inlet pipe, a transmitting pipe, a support and a control valve;
wherein the processor is configured to:
acquire the coal detection depth of the target detection area; and
adjust, according to the coal detection depth, a gas pressure in the air chamber, a bullet diameter and a bullet length, for any one of the drop hammer impact seismic sources, so as to obtain the target seismic source energy.

9. A non-transitory computer-readable storage medium having stored therein computer programs that, when executed by a processor, cause the following operations to be implemented:
acquiring a target velocity inversion map of a coal and rock mass in a target detection cycle;
wherein the target velocity inversion map is configured to indicate a target velocity of seismic wave propagation in each of grid cells in a target detection area;
acquiring a first velocity of seismic wave propagation in any one of the grid cells in at least one detection cycle preceding the target detection cycle;
determining, according to each of the first velocities and the target velocities, structural abnormal cells from each of the grid cells; and
determining, according to the structural abnormal cells, a range of a structural abnormal area of the coal and rock mass in the target detection cycle in the target velocity inversion map;
wherein determining, according to each of the first velocities and the target velocities, the structural abnormal cells from each of the grid cells comprises:
for any one of the grid cells, determining, according to each of the first velocities and the target velocities of the grid cells, a wave velocity variation trend of the grid cell; and
determining that the grid cell is the structural abnormal cell, in response to the wave velocity variation trend of the grid cell being an upward trend and the target velocity being greater than a first set threshold;

wherein acquiring the target velocity inversion map of the coal and rock mass in the target detection cycle comprises:

determining the target detection area of the coal and rock mass and a target seismic source energy corresponding to at least one drop hammer impact seismic source, for the target detection cycle; wherein the target detection area is provided with a plurality of geophones at a first side thereof, and is provided with excitation points corresponding to each of the drop hammer impact seismic sources at a second side thereof;

controlling each of the drop hammer impact seismic sources to excite seismic waves via corresponding excitation points under a corresponding target seismic source energy, so that any one of the geophones receives seismic waves excited from each of the excitation points;

acquiring a first arrival time of the seismic waves excited at each of the excitation points from any one of the geophones; and determining, according to the first arrival time of the seismic waves excited at each of the excitation points, the target velocity inversion map of the coal and rock mass in the target detection cycle by a seismic wave tomography;

wherein determining, according to the first arrival time of the seismic waves excited at each of the excitation points, the target velocity inversion map of the coal and rock mass in the target detection cycle by the seismic wave tomography comprises:

establishing an initial velocity model, wherein each of the grid cells in the target detection area has a corresponding initial velocity;

performing, according to the initial velocity and the first arrival time, multiple rounds of iterative inversion calculations on the initial velocity model to update the initial velocity in the initial velocity model to the target velocity; and acquiring, according to the target velocity, the target velocity inversion map of the target detection area in the target detection cycle.

10. The non-transitory computer-readable storage medium of claim 9, wherein the processor is configured to:
determine that the grid cell is the structural abnormal cell, in response to the wave velocity variation trend of the grid cell being an upward trend first and then a downward trend and the target velocity being greater than a second set threshold; wherein the second set threshold is less than the first set threshold.

11. The non-transitory computer-readable storage medium of claim 9, wherein the processor is configured to:
update a cycle duration of a detection cycle following the target detection cycle.

12. The non-transitory computer-readable storage medium of claim 9, wherein the target detection area has a corresponding coal detection depth; the drop hammer impact seismic source comprises a transmitter component, a control component, a hydraulic station, an evacuation device, a high-pressure nitrogen cylinder, an anvil and an accessory vehicle; wherein the transmitter component comprises an air chamber, an inlet pipe, a transmitting pipe, a support and a control valve;

wherein the processor is configured to:

acquire the coal detection depth of the target detection area; and adjust, according to the coal detection depth, a gas pressure in the air chamber, a bullet diameter and a bullet length, for any one of the drop hammer impact seismic sources, so as to obtain the target seismic source energy.

* * * * *